United States Patent
Mohler

(10) Patent No.: US 9,715,945 B2
(45) Date of Patent: Jul. 25, 2017

(54) FUSION REACTOR

(71) Applicant: Jonathan Mohler, Vero Beach, FL (US)

(72) Inventor: Jonathan Mohler, Vero Beach, FL (US)

(73) Assignee: SPECTRE ENTERPRISES, INC., West Palm Beach, FL (US)

( * ) Notice: Subject to any disclaimer, the term of this patent is extended or adjusted under 35 U.S.C. 154(b) by 0 days.

(21) Appl. No.: 14/981,254

(22) Filed: Dec. 28, 2015

(65) Prior Publication Data

US 2016/0336079 A1 Nov. 17, 2016

Related U.S. Application Data

(60) Provisional application No. 62/095,699, filed on Dec. 22, 2014.

(51) Int. Cl.
| | |
|---|---|
| *G21B 1/15* | (2006.01) |
| *G21B 3/00* | (2006.01) |
| *H05H 7/00* | (2006.01) |
| *H05H 3/06* | (2006.01) |

(52) U.S. Cl.
CPC ............ *G21B 3/002* (2013.01); *G21B 3/006* (2013.01); *H05H 3/06* (2013.01); *H05H 2007/007* (2013.01)

(58) Field of Classification Search
CPC .... H05H 2007/007; H05H 7/001; H05H 3/06; G21B 3/006; G21K 1/087
USPC ................. 376/107, 113, 114, 115, 116, 117
See application file for complete search history.

(56) References Cited

U.S. PATENT DOCUMENTS

| | | | | |
|---|---|---|---|---|
| 2,489,436 | A | * 11/1949 | Salisbury ................. | H05H 3/06 376/109 |
| 3,258,402 | A | 6/1966 | Farnsworth | |
| 4,830,813 | A | * 5/1989 | Dance ...................... | H05H 3/06 376/114 |
| 4,968,527 | A | * 11/1990 | Yoshimoto ............. | B82Y 30/00 427/122 |
| 5,160,695 | A | 11/1992 | Bussard | |

(Continued)

OTHER PUBLICATIONS

Gimeno, "Electrochemical Formation of Palladium Islands on HOPG: Kinetics, Morphology, and Growth Mechanisms", J. Phys. Chem. B, 2002, 106, pp. 4232-4244.*

(Continued)

*Primary Examiner* — Jack W Keith
*Assistant Examiner* — Daniel Wasil
(74) *Attorney, Agent, or Firm* — William F. Lang, IV; Lang Patent Law LLC

(57) ABSTRACT

A fusion reactor includes a columnating panel disposed between the positive electrode and negative electrode for channeling deuterium ions along predetermined paths that are likely to lead to fusion-producing collisions with previous deuterium ions. Deuterium ions are introduced to the reactor adjacent to the positive electrode, and then pass from the columnating panel, through a reduced pressure chamber, and then proceed towards the negative electrode. Once the deuterium ions strike the negative electrode, they remain attached to the negative electrode so that subsequent deuterium ions following the same channels through the columnating panel are more likely to collide with them.

6 Claims, 4 Drawing Sheets

(56) References Cited

U.S. PATENT DOCUMENTS

| | | | | |
|---|---|---|---|---|
| 5,729,580 A | * | 3/1998 | Millspaugh | G21B 3/00 376/115 |
| 7,968,838 B2 | * | 6/2011 | Dent | H05H 3/06 376/107 |
| 7,978,804 B2 | * | 7/2011 | Groves | H05H 3/06 376/114 |
| 2015/0155127 A1 | * | 6/2015 | Fink | H05H 3/06 250/427 |

OTHER PUBLICATIONS

Klages, "Deuterium Retention in Carbon, Beryllium, and Carbon Layers on Titanium and Beryllium", University of Surrey, Sep. 2005.*

"Anisotropy," Asbury Carbons (2013), https://asbury.com/technical-presentations-papers/introduction-to-graphite/anisotropy/.

B. Naranjo, J. K. Gimzewski, & S. Putterman, "Observation of Nuclear fusion Driven by a Pyroelectric Crystal," 434 Nature 1115-1117 (Apr. 28, 2005).

Buddhika Jayasena and Sathyan Subbiah, "A Novel Mechanical Method for Synthesizing Few-Layer Graphenes," Nanoscale Research Letters (2011), http://nanoscalereslett.springerope.

"Graphene," Wikipedia, https://en.wikipedia.org/wiki/Graphene.

Highly Ordered Pyrolytic Graphite, http://www.vecorus.com/nst_gal/Hopg.html.

"HOPG," http://nanoprobes.aist-nt.com/apps/HOPG%20info.htm.

"Pyrolytic Carbon," Wikipedia, https://en.wikipedia.org/wiki/Pyrolytic_carbon.

Robert L. Hirsch, "Internal Electrostatic Confinement of Ionized Fusion Gases," 38 Journal of Applied Physics 4522-4534 (Oct. 1967).

E. P. Wagner, R. A. Butera, and D. H. Waldeck, "Structural Characterization of Graphite," (Sep. 2013).

Min Qian, Yun Shen Zhou, Yang Gao, Jong Bok Park, and Tao Feng, "Formation of Graphene Sheets Through Laser Exfoliation of Highly Ordered Pyrolytic Graphite," Faculty Publicat.

* cited by examiner

A
ATOMS

B
ATOMS

FUSION REACTOR

CROSS REFERENCE TO RELATED APPLICATION

This application claims the benefit of U.S. Provisional Patent Application No. 62/095,699, which was filed on Dec. 22, 2014, and entitled Fusion Reactor.

TECHNICAL FIELD

The present invention relates to nuclear fusion reactors. More specifically, a means of guiding electrons and ions towards locations having a higher probability of collisions and reactions is provided.

BACKGROUND INFORMATION

Producing a fusion reaction utilizing prior art methods requires accelerating ions at sufficient speed for the reaction to occur in an environment having a sufficiently high ion density so that collisions between ions and resulting fusion occurs with useful frequency. Maintaining this ion density has been attempted by confining the ions utilizing various combinations of electric potential differences, magnetic fields, acoustic waves, and inertia. Many prior art systems rely on injecting ions into concentric electrode structures in an effort to cause the ions to repeatedly pass through the center of the spherical structure at sufficient speed and with sufficient ion density to make collisions between the ions likely. Successfully producing fusion reactions at room temperature remains a challenge when utilizing prior art techniques.

U.S. Pat. No. 3,258,402, which was issued to P. T. Farnsworth on Jun. 28, 1966, discloses an electric discharge device for producing interactions between nuclei. The device includes a generally spherical external cathode and a porous, generally spherical internal anode. Applying a voltage between the cathode and anode results in the flow of both electrons and ions towards the center of the anode. Inertia continues to carry the electrons and ions through the center, and then away from the center. As a result of attraction and repulsion forces resulting from opposite and like charges within the system, electrons and ions will then be propelled back towards the center again. The proximity to the center of the reactor results in a likelihood of collisions between the particles.

Robert Hirsch, *Inertial Electrostatic Confinement of Ionized Gases*, 38 JOURNAL OF APPLIED PHYSICS 4522, October 1967, describes research and experiments involving fusion reactions utilizing concentric spherical, high vacuum systems that are designed to direct electrons and ions radially towards the center of the system. The system described therein includes an ion permeable spherical cathode that is concentrically surrounded by an ion emissive spherical anode. Ions are drawn to the center of the spherical structure not only through the potential difference between the cathode and anode, but also by the presence of a virtual cathode formed by electrons that have been injected into the system. Symmetrically placed ion guns inject pencil-shaped ion beams into the spherical structure. The cathode includes open ports opposite each ion gun. The cathode ports include bias assemblies that are connected through an isolation transformer to a power supply for resisting electron flow out of the cathode and towards the anode.

According to U.S. Pat. No. 5,160,695, discussed in greater detail below, the system described by the above references requires sufficiently high electron current circulating across the system that the required electron currents can only be attained if electrons and/or ions are not removed by collisions with various structures, such as grids and/or walls of the system. Thus, the existence of grid structures in the path of the circulating particle flows prevents the buildup of sufficiently large circulating currents needed to obtain the desired system power gain values.

U.S. Pat. No. 5,160,695, issued to R. W. Bussard on Nov. 3, 1992, discloses a method and apparatus for creating and controlling nuclear fusion reactions. The system uses a substantially spherical electrostatic field geometry in order to accelerate ions in a radial direction towards the center of the sphere. The ions are accelerated at sufficient speed in flux density to initiate ion acoustic waves having wavelengths that is small compared to the radius at which initiation of the waves occurs. The ion acoustic wavelength is nearly an exact integer divisor of the circumference of the sphere at the core radial position at which the onset of ion acoustic waves occurs. This ensures resonance coupling of ion flow with these waves in a tangential direction around the sphere. Incoming particles are trapped in the acoustic wave structures, and effusively move through the core. The resonant coupling of ion motion and ion acoustic waves causes ion/wave collisions within the small core radius. These collisions asked to trap and confine ions by collisional diffusion processes within the core. Electrons are provided to the interior region of the sphere by collisions with neutral gas within the sphere region or by electron injection. Inserting electrons prevents the buildup of positive charge density resulting from ion densification. Ions can also be added by direct injection of energetic ions or by the addition of neutral gas to the ion injection region. In the latter case, the neutral gas is ionized by collisions with electrons or ions. Concentric electrode arrays may be used. These electrodes are wireframe electrodes arranged to form approximately equal areas on a spherical surface surrounding the central region. These electrodes are used to create a potential difference to accelerate ions inward. External concentric electrodes are used to decelerate electrons otherwise driven out of the system by interior ionic accelerating fields, or to accelerate ions inward.

Brian Naranjo, Seth Putterman, and Jim Gimzewski, *Observation of Nuclear Fusion Driven by a Pyroelectric Crystal*, 434 NATURE 1115, Apr. 28, 2005, describes the utilization of the electromagnetic field of a pyroelectric crystal in a deuterated atmosphere to accelerate a deuteron beam towards a deuterated target. The crystal can be heated or cooled, thereby increasing its spontaneous polarization as well as the accumulated charges on the faces which are normal to the polarization. Heating the crystal reduces the spontaneous discharge of these electrons, facilitating the buildup of a large potential. This potential can then be utilized to accelerate ions.

All of the systems described above are limited by accelerating the ions through a deuterium atmosphere. The deuterium atmosphere causes many sub-threshold collisions and results in wasteful redistribution of kinetic energy. These systems also accelerate ions in a relatively wide cone angle, making effective collisions less probable. Accordingly, there is a need for a fusion reactor that will increase the likelihood of collisions resulting in fusion reactions while reducing collisions that do not result in fusion. There is a further need for a fusion reactor having a means of directing ions towards locations wherein there is a heightened probability of other ions therein, thus increasing the likelihood of fusion producing collisions.

SUMMARY

The above needs are met by a fusion reactor. The fusion reactor has a gas inlet having an exit adjacent to a positive electrode. A columnating panel having an atomic crystal structure defining a plurality of substantially straight channels therein is disposed adjacent to the positive electrode. The channels are oriented substantially perpendicular to the positive electrode. The channels are structured to direct gas atoms along paths defined by the channels. A reduced pressure chamber is disposed adjacent to the columnating panel, opposite the positive electrode. A negative electrode is disposed on the opposing side of the reduced pressure chamber.

A method of perpetuating a fusion reaction is also disclosed. The method includes providing a positive electrode as well as a negative electrode, and applying a potential difference between the positive electrode and the negative electrode. A columnating panel is provided between the positive electrode and the negative electrode. The columnating panel has an atomic crystal structure defining a plurality of substantially straight channels therein. A flow of ions is initiated from the positive electrode, through the columnating panel, and to the negative electrode. Ions passing through the channels in the columnating panel follow paths determined by the channels, so that subsequent ions passing through the channels follow substantially the same path as previous ions. Therefore, subsequent ions strike the negative electrode at locations wherein previous ions are disposed on the negative electrode, thus increasing a likelihood of fusion reactions resulting from ion collisions.

These and other aspects of the invention will become more apparent through the following description and drawings.

BRIEF DESCRIPTION OF THE DRAWINGS

Like reference characters denote like elements throughout the drawings.

DETAILED DESCRIPTION

Figure 1:
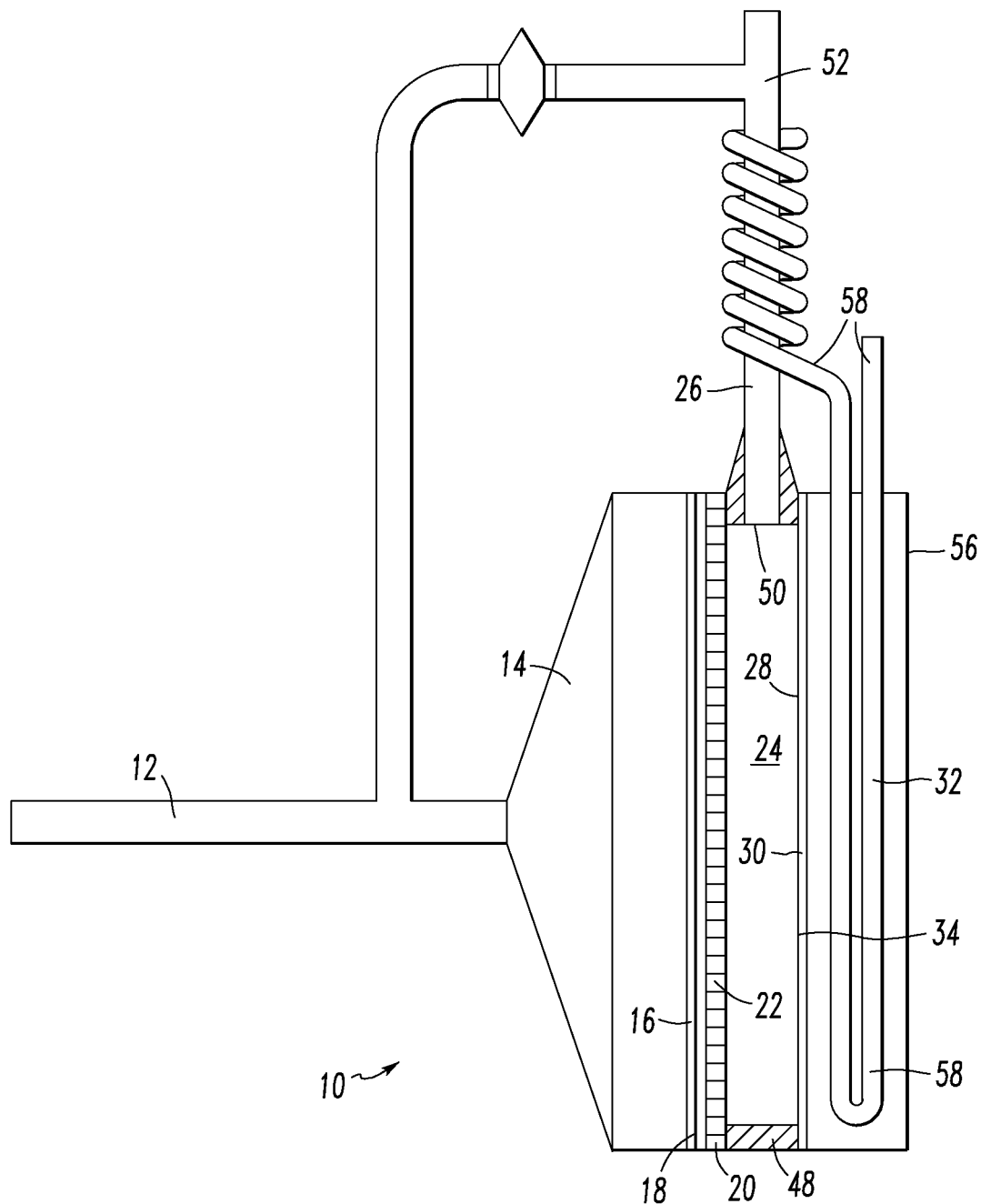
FIG. 1 is a schematic diagram of a fusion reactor.

Referring to FIG. 1, a fusion reactor is illustrated. The fusion reactor 10 includes a gas inlet 12 for inserting deuterium gas into the system. The gas inlet 12 is connected to a funnel 14 that terminates in a positive electrode 16 at the wide exit 18 of the funnel 14. A columnating panel 20, which will be described in greater detail below, is disposed adjacent to the positive electrode 16. The exit face 22 of the columnating panel 20 is disposed next to a reduced pressure chamber 24, wherein pressure may be reduced by the vacuum system 26. The opposite side of the vacuum chamber 24 is formed by the target face 28 of the negative electrode 30. A heat transfer system 32 abuts the opposing face 34 of the negative electrode 30.

The positive electrode 16 is made from a deuterium-porous material, so that deuterium ions that are inserted into the system through the gas inlet 12 may pass through the positive electrode 16, and be accelerated towards the negative electrode 30 by the potential difference therebetween. Examples of such deuterium-porous material include palladium, platinum, or titanium. As another alternative, the positive electrode can be a fine screen or mesh, so that the deuterium can pass through the openings in the screen or mesh. The positive electrode 16 is also electrically connected to the positive terminal of a power supply (not shown, but well known to those skilled in the art of electronics).

Figure 2:
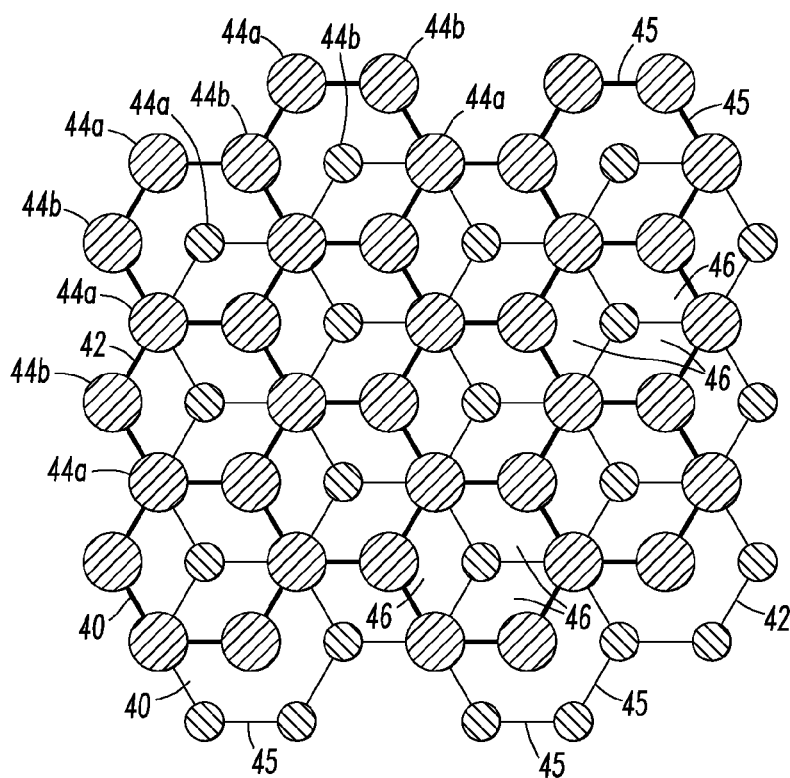
FIG. 2 is a diagrammatic top view showing the crystal structure of a columnating panel for a fusion reactor of FIG. 1.
Figure 2:
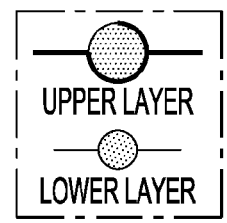
Figure 3:
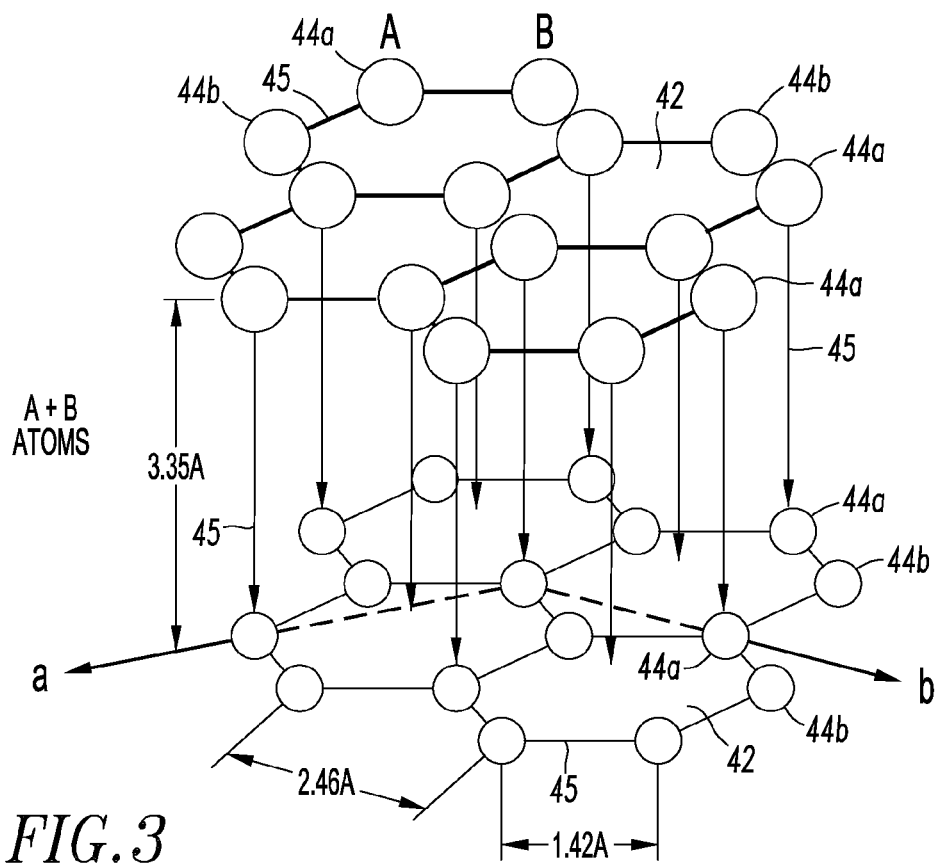
FIG. 3 is a diagrammatic perspective view showing the crystal structure of a columnating panel for a fusion reactor of FIG. 1.
Figure 4:
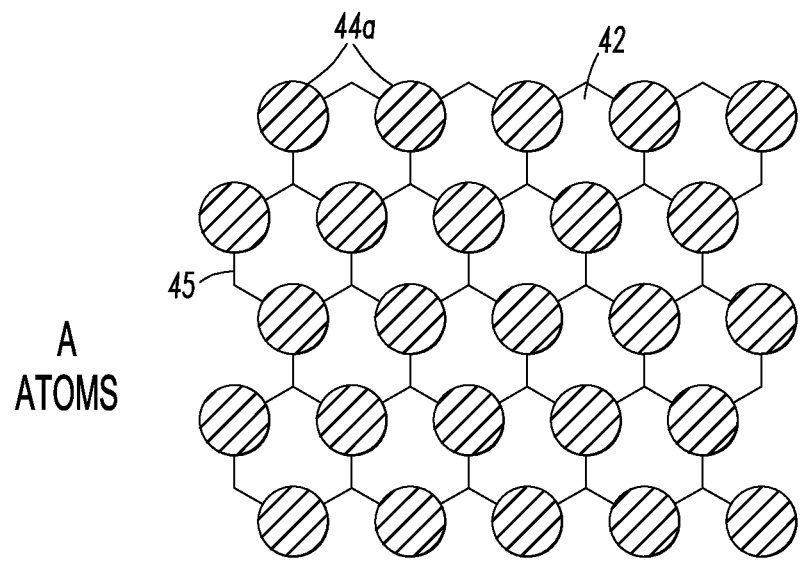
FIG. 4 is a diagrammatic top view showing a portion of the crystal structure of a columnating panel for a fusion reactor of FIG. 1.
Figure 5:
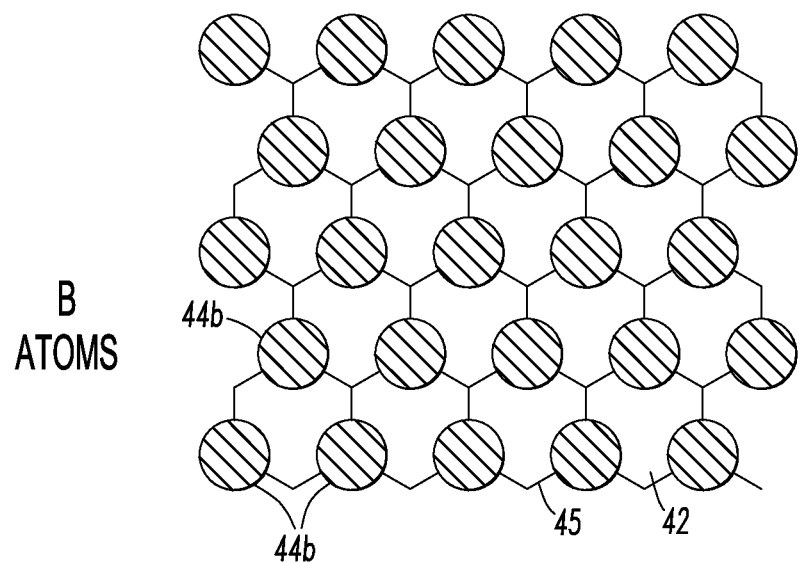
FIG. 5 is a diagrammatic top view showing a portion of the crystal structure of a columnating panel for a fusion reactor of FIG. 1.

The columnating panel 20 is made from a material containing tiny, substantially straight channels therethrough. These channels serve to direct deuterium ions leaving the positive electrode 16 in a predetermined direction along a narrow, predictable path. Materials which are permeable to deuterium have the potential to serve as columnating panels. More specifically, group 4A elements in the Periodic Table of the Elements, such as carbon and silicon, have the potential to form crystal structures having sufficiently straight paths therethrough for a deuterium ion to follow. An example of such a material is pyrolytic graphite, with a more specific example being highly ordered pyrolytic graphite. The crystal structure of highly ordered pyrolytic graphite is illustrated in FIGS. 2-6. Each layer 40 of graphite is formed from a hexagonal lattice of carbon atoms, with the corner of each hexagon 42 being defined by a single carbon atom 44, and the bonds 45 between carbon atoms forming the sides of the hexagon as well as the connections between layers. As used herein, 44 refers generally to a carbon atom, while 44a and 44b refer to specific groups of carbon atoms as explained in greater detail below. As shown in FIGS. 4-5, three of the six corners of each hexagon 42 are formed by carbon atoms 44a, with the remaining corners being formed by carbon atoms 44b. Carbon atoms 44a and 44b alternate within each individual hexagon 42. As shown in FIG. 3, each of the carbon atoms 44a is bonded to the carbon atoms 44a within the adjacent upper and lower layers 40. Each of the carbon atoms 44b is disposed within the center of a hexagon 42 defined by the carbon atoms 44 within the adjacent upper and lower layers 40. Viewing this structure perpendicular to the layers 40 as shown in FIG. 2 reveals that each hexagon 42 is divided into three substantially straight channels 46. These channels 46 extend completely through the columnating panel 20, in a direction that is substantially perpendicular to the layers 40.

Figure 6:
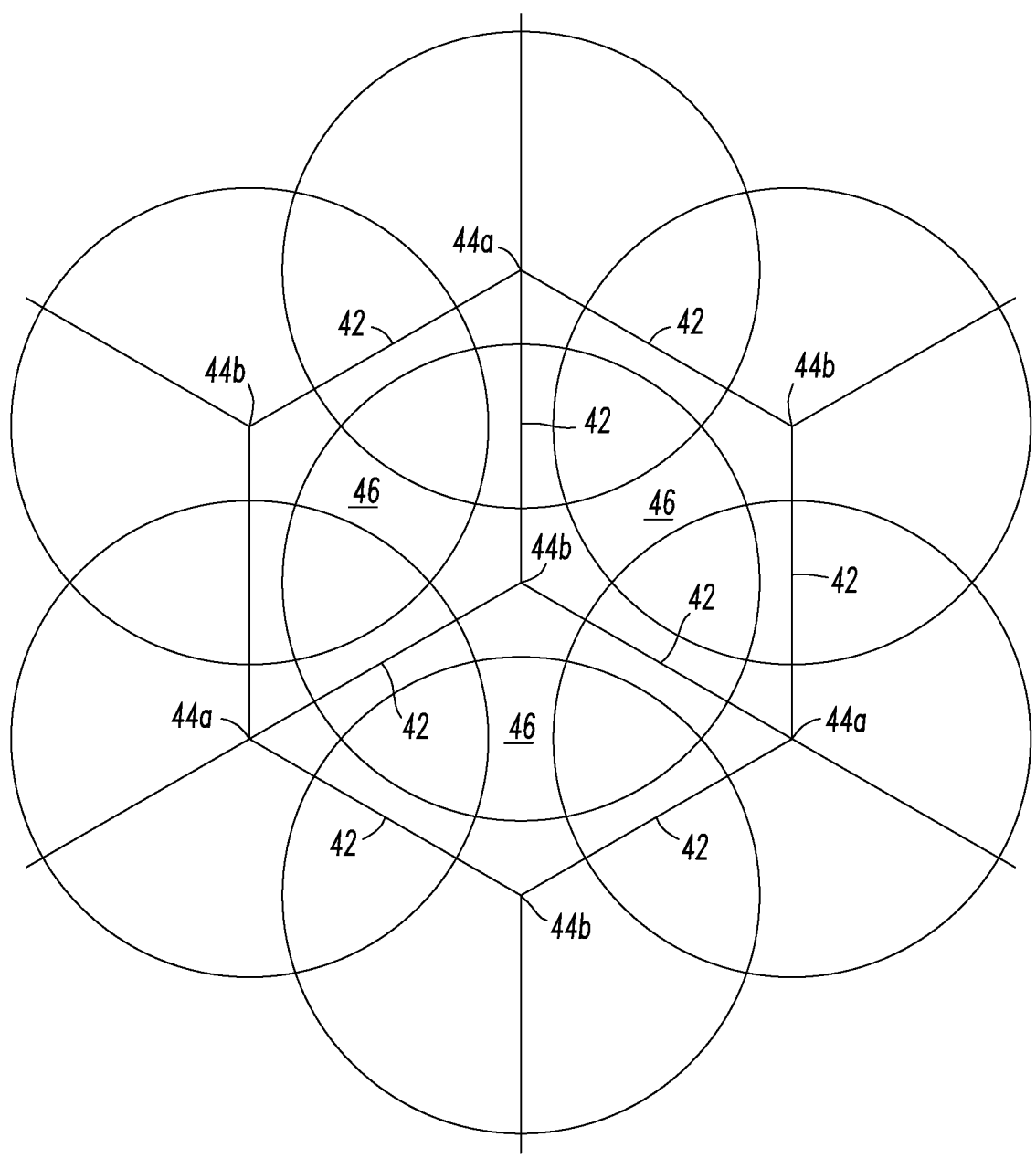
FIG. 6 is a diagrammatic top view showing the overlapping electron orbits within two layers of the hexagonal structure of FIG. 2.

The channels 46 provide a relatively tightly constrained, but entirely usable, substantially straight path for a deuterium ion. The center to center distance between carbon atoms within each layer is 0.1415 nm, and the center to center distance between graphite layers is 0.3354 nm. A carbon atom 44 has a diameter of about 0.22 nm including the electron orbits, and a hydrogen atom has a diameter of about 0.1 nm, including the electron orbits. The electron orbits are largely empty space occupied by the orbiting electrons, with the nucleus of each atom being on the order of about $10^{-15}$ m. The resulting electron shell overlaps are illustrated in FIG. 6. The electron orbits do not present a physical barrier to passage of deuterium, but the passage of deuterium electron orbits through carbon electron orbits may cause some electron interference to the passage of deuterium. It is anticipated that a sufficiently high voltage potential between the positive electrode 16 and negative electrode 30 will overcome any electron interference. The crystal structure, as well as repulsion between the positive nucleus of the carbon atoms and the positive nucleus of the deuterium ions will thus tend to center the deuterium ions within the channels 46 as the deuterium ions pass through the columnating panel 20.

Highly ordered pyrolytic graphite having a desired layer orientation can be produced by presently known procedures. Examples include those described in U.S. Pat. No. 4,968,527, issued to Y. Yoshimoto et al. on Nov. 6, 1990, the entire disclosure of which is expressly incorporated herein by reference. Alternatively, if the orientation of the layers is unknown, the electrical and thermal conductivity of the graphite are known to be significantly higher in a direction that is substantially parallel to the graphite layers than in a direction that is substantially perpendicular to these layers. Testing the electrical or thermal properties in multiple directions can thus enable a determination about the direction of the layers, and therefore the appropriate construction of a columnating panel. As another alternative, graphite layers have high intra-layer strength but low inter-layer cohesion, so layers separate relatively easily from each other, but individual layers are extremely tough. Thus, the physical properties of the graphite can be tested to determine the layer orientation.

As another alternative, since the positive electrode is made from a deuterium-porous material, the positive electrode may serve as both the electrode and the columnating panel, provided that the electrode itself defines substantially straight channels within its crystal structure.

The reduced pressure chamber 24 is defined between the exit face 22 of the columnating panel 20, the target face 28 of the negative electrode 30, and an insulating wall 48 extending around the periphery of the reduced pressure chamber 24. An inlet 50 for the vacuum system 26 is defined within a portion of the insulating wall 48 along one side of the reduced pressure chamber 24, connecting to a vacuum tube 52.

The negative electrode 30 is made from a material having good thermal conductivity. Examples include titanium, titanium diboride, palladium, and tantalum. The negative electrode 30 is electrically connected to the negative terminal of the power supply (not shown but well known to those skilled in electronics).

The heat transfer system 32 includes a heat transfer block 56 having fluid filled tubes 58 therein. The fluid filled tubes 58 may also be coiled around the vacuum tube 52.

In use, a voltage potential will be applied between the positive electrode 16 and negative electrode 30. The voltage will be selected to be sufficiently large to cause deuterium to pass through the columnating panel 20, overcoming any electron interference. In the illustrated example, the voltage is greater than about 0.1 MeV. Deuterium ions will be inserted into the system through the gas inlet 12, funnel 14, and positive electrode 16. The voltage potential between the positive electrode 16 and negative electrode 30 will accelerate the deuterium ions through the columnating panel 20, where the ions will pass through the relatively narrow, substantially straight channels 46 formed therein. The vacuum system 26 will be used to reduce the pressure within the reduced pressure chamber 24 to a pressure level that corresponds to a deuterium mean free path that is greater than the electrode separation distance, thus reducing any likelihood of collisions within that reduced pressure chamber that are insufficient to produce a fusion reaction. The ions will continue to travel through the reduced pressure chamber 24, continuing to follow paths corresponding to those defined by the channels 46 within the columnating panel 20 until they strike the negative electrode 30, becoming implanted in or near the target surface 28. Subsequent deuterium ions passing through the same channels 46 of the columnating panel 20 will follow very similar paths, and will be directed towards the previously impacted deuterium ions already imbedded on the target surface 28. The result is a heightened probability of collisions between deuterium ions.

The fusion reactor described herein therefore provides a means of enhancing the probability that ions will incur fusion-producing collisions. Ions follow predetermined paths through the columnating panels, landing in predetermined locations on the negative electrode. Subsequent ions following the same channels through the columnating panels are therefore more likely to collide with previous ions at the negative electrode. The efficiency of the fusion reaction is therefore enhanced.

A variety of modifications to the above-described embodiments will be apparent to those skilled in the art from this disclosure. Thus, the invention may be embodied in other specific forms without departing from the spirit or essential attributes thereof. The particular embodiments disclosed are meant to be illustrative only and not limiting as to the scope of the invention. The appended claims, rather than to the foregoing specification, should be referenced to indicate the scope of the invention.

What is claimed is:

1. A nuclear fusion reactor, comprising:
    a gas inlet having an exit;
    a positive electrode disposed adjacent to the exit;
    a columnating panel disposed adjacent to the positive electrode, the columnating panel having an atomic crystal structure defining a plurality of substantially straight channels therein, the channels being oriented substantially perpendicular to the positive electrode, the channels being structured to direct gas atoms along paths defined by the channels, the columnating panel being made from pyrolytic graphite;
    a reduced pressure chamber adjacent to the columnating panel, opposite the positive electrode; and
    a negative electrode adjacent to the reduced pressure chamber, opposite the columnating panel, the positive and negative electrodes being connected to a power supply that is structured to generate a voltage between the positive electrode and the negative electrode;
    whereby deuterium gas is directed from the gas inlet, through the positive electrode, and along a substantially straight path continuing through the columnating panel, through the reduced pressure chamber, and onto the negative electrode;
    whereby ions passing through the channels in the columnating panel follow paths determined by the channels, so that subsequent ions passing through the channels follow substantially the same path as previous ions, and subsequent ions strike the negative electrode at locations wherein previous ions are disposed on the negative electrode, resulting in at least a sufficient number deuterium ions striking other deuterium ions on the negative electrode to produce a fusion reaction.

2. The fusion reactor according to claim 1, wherein the positive electrode is permeable to gas.

3. The fusion reactor according to claim 1, wherein the positive electrode covers the exit of the gas inlet.

4. The fusion reactor according to claim 1, wherein the columnating panel is made from highly ordered pyrolytic graphite defining a plurality of layers of hexagonally arranged carbon atoms.

5. The fusion reactor according to claim 4, wherein the layers of hexagonally arranged carbon atoms are oriented substantially perpendicular to a direct path between the positive electrode and the negative electrode.

6. The fusion reactor according to claim 1, wherein the reduced pressure chamber is operatively connected to a vacuum system, the vacuum system being structured to reduce pressure within the reduced pressure chamber to a pressure level that corresponds to a deuterium mean free path that is greater than the electrode separation distance.

* * * * *